(12) United States Patent
Olivier et al.

(10) Patent No.: US 7,793,606 B2
(45) Date of Patent: Sep. 14, 2010

(54) POSITION CONTROLLER FOR A TOWED ARRAY

(75) Inventors: André W. Olivier, River Ridge, LA (US); Lloyd Joseph LaCour, Jr., Sequim, WA (US)

(73) Assignee: ION Geophysical Corporation, Houston, TX (US)

( * ) Notice: Subject to any disclaimer, the term of this patent is extended or adjusted under 35 U.S.C. 154(b) by 707 days.

(21) Appl. No.: 11/674,539

(22) Filed: Feb. 13, 2007

(65) Prior Publication Data

US 2009/0211509 A1    Aug. 27, 2009

(51) Int. Cl.
B63G 8/14 (2006.01)

(52) U.S. Cl. .......................... 114/245; 244/3.28; 367/17

(58) Field of Classification Search .................. 114/242, 114/244, 245, 246, 253; 367/15, 16, 17, 367/19, 20; 244/3.24, 3.28, 3.29
See application file for complete search history.

(56) References Cited

U.S. PATENT DOCUMENTS

| | | | |
|---|---|---|---|
| 3,434,446 A | 3/1969 | Cole | |
| 3,605,674 A | 9/1971 | Weese | |
| 3,611,975 A * | 10/1971 | Ashbrook | 114/245 |
| 3,774,570 A | 11/1973 | Pearson | |
| 3,931,608 A | 1/1976 | Cole | |
| 3,943,483 A | 3/1976 | Strange | |
| 3,961,303 A | 6/1976 | Paitson | |
| 4,222,340 A | 9/1980 | Cole | |
| 4,463,701 A | 8/1984 | Pickett et al. | |
| 4,711,194 A | 12/1987 | Fowler | |
| 5,532,975 A | 7/1996 | Elholm | |
| 5,619,474 A | 4/1997 | Kuche | |
| 6,011,752 A | 1/2000 | Ambs et al. | |
| 6,016,286 A | 1/2000 | Olivier et al. | |
| 6,031,789 A | 2/2000 | Broussard et al. | |
| 6,144,342 A | 11/2000 | Bertheas et al. | |
| 6,459,653 B1 | 10/2002 | Kuche | |
| 6,525,992 B1 | 2/2003 | Olivier et al. | |
| 6,671,223 B2 | 12/2003 | Bittleston | |
| 6,879,542 B2 | 4/2005 | Soreau et al. | |
| 6,932,017 B1 | 8/2005 | Hillesund et al. | |
| 6,985,403 B2 | 1/2006 | Nicholson | |
| 7,092,315 B2 | 8/2006 | Olivier et al. | |
| 2006/0176775 A1 | 8/2006 | Toennessen | |
| 2006/0285434 A1 | 12/2006 | Welker et al. | |

* cited by examiner

Primary Examiner—Lars A Olson
(74) Attorney, Agent, or Firm—James T. Cronvich

(57) ABSTRACT

A position controller capable of controlling the depth or lateral position of a towed array. The position controller comprises a tubular fuselage from which a pair of wings may be extended over a range of sweep angles between fully open and stowed positions. In fully or partly open positions, two wings present a positive angle of attack relative to the axis of the fuselage. In the stowed position, the wings are fully retracted into a wing receptacle within the fuselage for unfettered passage into and out of a submarine on the array deployment and retrieval handling system.

27 Claims, 8 Drawing Sheets

POSITION CONTROLLER FOR A TOWED ARRAY

STATEMENT REGARDING FEDERALLY SPONSORED RESEARCH OR DEVELOPMENT

This invention was made with Government support under Small Business Innovation Research (SBIR) Program Contract No. N00024-05-C-4159 awarded by The United States Navy. The Government has certain rights in the invention.

BACKGROUND

The invention relates generally to towed hydrophone arrays and, more particularly, to devices for controlling the positions of towed arrays.

Linear hydrophone arrays are towed behind submarines for sonar applications. Typical linear arrays are tubular in shape with a diameter no greater than a few inches. The arrays are payed out and retrieve by handling equipment through a small opening in the submarine. The handling equipment generally includes a reel for a tow cable attached to the head end of the array. The tow cable includes both strength members and electrical conductors for powering and communicating with electronics in the array. When towed at low speeds, the array tends to sink because of the weight of the tow cable and the array itself. When the array sinks, its aft end rides deeper than its fore end, which causes its sensor performance to suffer. Furthermore, there is a greater opportunity for the array to be damaged by collision with the sea floor or underwater obstructions. Often it is desirable to operate the array out of the wake or the acoustic shadow of the submarine. This can be achieved to some extent through submarine maneuvers, but such maneuvers may not be possible or preferred in some circumstances.

Consequently, there is a need to prevent a towed array from sinking at low towing speeds and to steer the array out of the wake or shadow of the submarine in a way that is compatible with conventional array handling systems.

SUMMARY

These needs and others are satisfied by an apparatus embodying features of the invention for positioning a towed underwater cable. In one aspect the apparatus comprises an elongated body with an outer surface disposed about a longitudinal axis. The elongated body is suitable for being connected axially in line with a towed underwater cable. A first wing swings outward from the elongated body through a first opening formed in the outer surface; a second wing swings outward from the elongated body through a second opening formed in the outer surface opposite the first opening. Each of the first and second wings extends from a root to a wing tip. A first wing actuator, which is disposed within the body and coupled to the root of the first wing, rotates the first wing on a first axis of rotation. The wing rotates from a stowed position within the elongated body to operational positions wherein the wing tip is outside the elongated body. The span of the first wing defines a first sweep angle with the longitudinal axis of the elongated body. A second wing actuator rotates the second wing similarly through a second sweep angle. The first and second sweep angles are independently adjustable by the first and second actuators.

In another aspect of the invention, a position controller comprises a body suitable for being connected in line with a towed underwater cable and a pair of dihedral wings. A first dihedral wing has a wing tip that can swing outward from the body through a first slot formed in the outer surface off the body. A second dihedral wing has a wing tip that can swing outward from the body through a second slot formed in the outer surface.

In yet another aspect of the invention, a position controller for a towed underwater cable comprises an elongated body suitable for being connected axially in line with a towed underwater cable. The elongated body has an outer surface disposed about a longitudinal axis with first and second slots through the outer surface. The first and second slots each include a forward segment that is oblique to the longitudinal axis and a rearward segment oblique to the forward segment. A first wing has a wing tip that swings outward from the elongated body through the first slot. A second wing has a wing tip that swings outward from the elongated body through the second slot.

In still another aspect of the invention, apparatus for positioning a towed underwater cable comprises an elongated body with an outer surface disposed about a longitudinal axis. The elongated body is suitable for being connected axially in line with a towed underwater cable. The outer surface is divided into a first half and a second half by a plane containing the longitudinal axis. The elongated body forms a first opening in the first half of the outer surface and a second opening in the second half of the outer surface. A first wing swings outward from the elongated body through the first opening. The first wing extends from a wing root along an inner wing panel to an outer wing panel terminated in a distal wing tip. A second wing swings outward from the elongated body through the second opening. The second wing extends from a wing root along an inner wing panel to an outer wing panel terminated in a distal wing tip. The inner wing panels of the first and second wings have chords defining a non-zero angle of attack with the longitudinal axis of the elongated body.

In another aspect of the invention, apparatus for positioning a towed underwater cable comprises a body having an outer surface disposed about a longitudinal axis. The body is suitable for being connected axially in line with a towed underwater cable. The outer surface is divided into a first half and a second half by a plane containing the longitudinal axis. A cavity that extends to a first opening in the first half of the outer surface a second opening in the second half of the outer surface is formed in the interior of the body. A first wing with upper and lower airfoil surfaces swings outward from the cavity through the first opening. A second wing with upper and lower airfoil surfaces swings outward from the cavity through the second opening. In a stowed position, the first and second wings are stacked in the cavity with the upper airfoil surface of the second wing adjacent the lower airfoil surface of the first wing.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
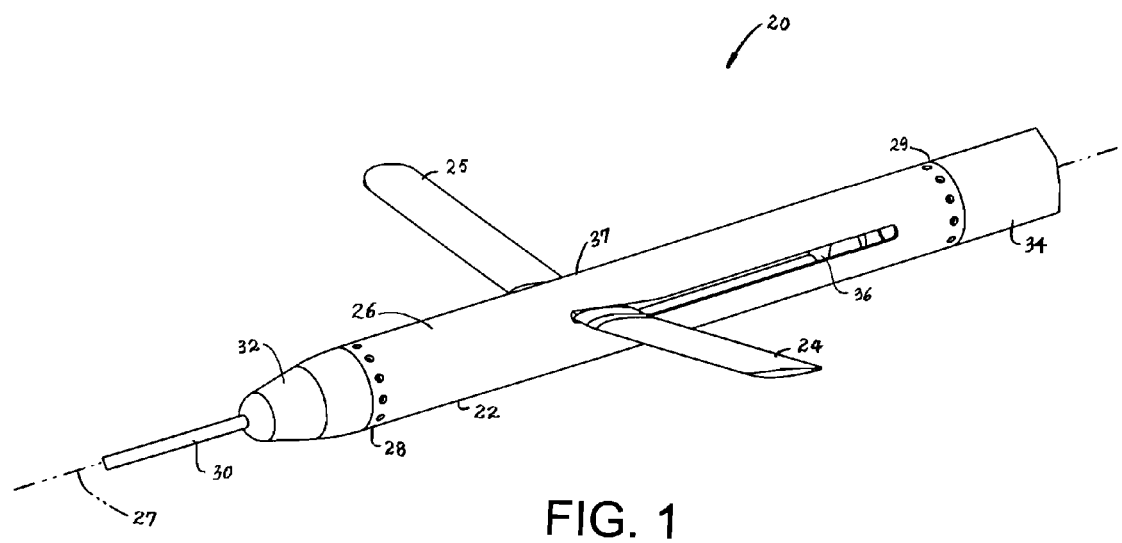
FIG. 1 is an isometric view of a cable positioning control device embodying features of the invention.

A position control apparatus embodying features of the invention as shown in FIG. 1. The position controller 20 comprises an elongated body, or fuselage 22, from which left and right retractable wings 24, 25 extend. The fuselage, which includes a preferably cylindrical outer surface, or tube 26, extends in length along a central longitudinal axis 27 from a head end 28 to a tail end 29. A tow cable 30, which includes electric power and signal conductors as well as a strength member, attaches to the head end of the fuselage through a nose cone 32. The rear end of the position controller attaches to a towed array 34. Thus, the position controller attaches in line between the tow cable and the head of the towed array. The wings are retractable through slots 36, 37 opening onto the outer surface of the fuselage.

Figure 2:
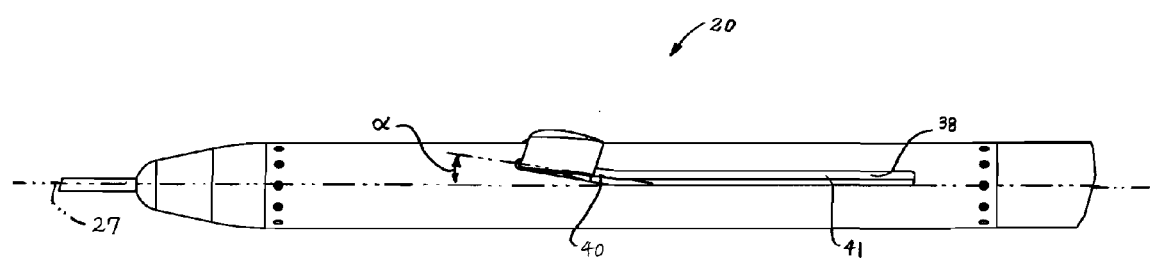
FIG. 2 is a side elevation view of the cable position controller of FIG. 1.

As shown in FIG. 2, the slots may communicate in the interior of the fuselage to define a single wing receptacle 38 through the fuselage. Each slot includes a forward segment 40 and an oblique rearward segment 41. In the device shown in FIG. 2, the rearward segment is parallel to the longitudinal axis 27 of the fuselage, and the forward segment is tilted off the longitudinal axis preferably at an angle α of 11° or less, and more preferably at an angle of about 7°. But the angle α is selected based on the performance requirements and the system parameters of the array being used. Consequently, α may even exceed 11° in some applications. The upward tilt of the slot from rear to front ensures a positive wing angle of attack relative to the longitudinal axis of the fuselage. In this way, even if the wings become locked through loss of power or physical damage, they will be in a position tending to move the fuselage upward under tow.

Figure 3:
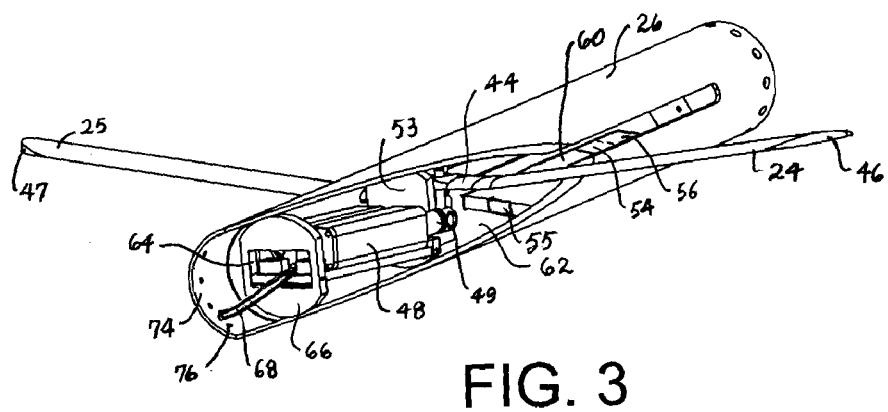
FIG. 3 is a front isometric view, partly cut away, of the position controller of FIG. 1.
Figure 4:
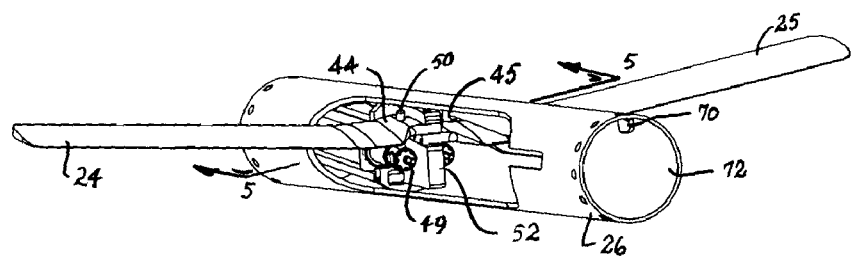
FIG. 4 is a rear isometric view, partly cut away, of the position controller of FIG. 1.
Figure 5:
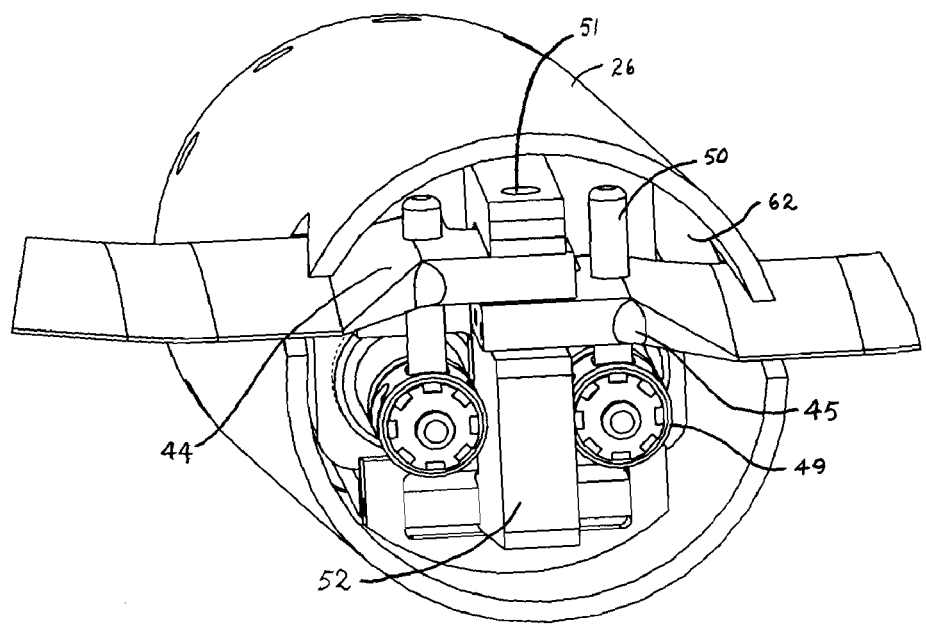
FIG. 5 is an enlarged oblique cross section of the position controller taken along lines 5-5 of FIG. 4.

As shown in FIGS. 3-5, each wing 24, 25 extends from a wing root 44, 45 to a distal wing tip 46, 47. The root of each wing is attached to an individual rotary actuator, which, in this example, is realized by a motorized linear actuator 48 turning a lead screw along which a nut 49 is advanced. One end of a rod 50 is received in an oversized opening in the nut, and the other end is received in a hole through the wing root. The linear motion of rod with the nut causes the wing to rotate about a stationary axle 51 through the wing root inward of the rod. The axle is supported in a support 52 mounted to a plate 53 attached to the inside of the fuselage. The actuators for each wing operate the same way and constitute independent actuators for each wing. The rod and the axle may serve as shear pins to prevent a wing stuck in an open position from damaging the submarine's array bay opening or the array handling system. Because, in this example, the two wings, like a pair of scissors, rotate on the same axle, they are offset slightly in a radial direction relative to the axis of the fuselage The actuators are controlled by an electronic wing control system housed in an electronics package 60 in the interior cavity 62 of the fuselage. The electronics package preferably includes a roll sensor 54, a wing position sensor 55, and, optionally, a depth sensor 56. (If the array includes a depth sensor, there may be no need for one in the position controller.) A forward port 64 formed in a front panel 66 of the fuselage admits power, signal, control, and communications conductors 68 from the tow cable into the fuselage to power and control the electronics. Some or all of the conductors pass through an aft port 70 in a rear panel 72 of the fuselage. One or more cable troughs extend along the length of the fuselage to guide the conductors past the actuators and around the wing receptacle. The nose cone is attached to a forward lip 74 of the fuselage by fasteners such as screws through holes 76 formed around the circumference of the lip. An O-ring or other seal on the nose cone assembly prevents sea water intrusion into the interior cavity of the fuselage. The outer tubular surface 26 of the fuselage serves as a strength member, bearing the tension of the towed array. The array is attached to the rear of the fuselage in a similar fashion as the nose cone. An O-ring or the like forms a watertight seal with the rear of the fuselage.

Figure 6A:
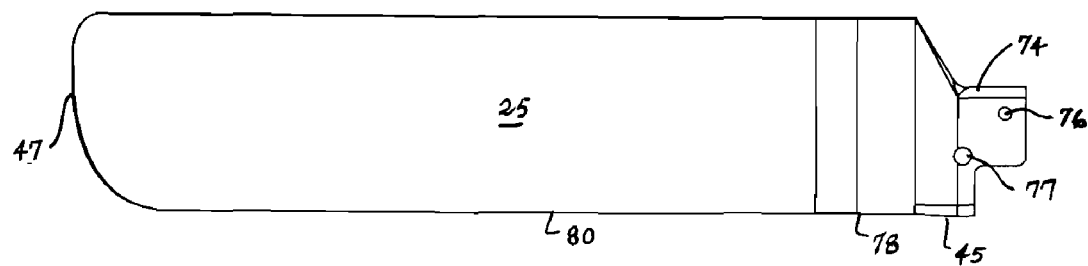
FIGS. 6A and 6B are top plan and front elevation views of the right wing of the position controller of FIG. 1.
Figure 6B:
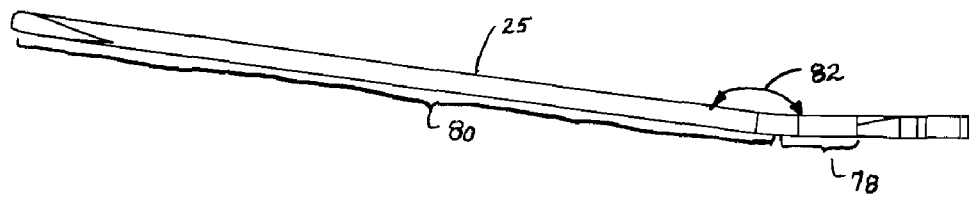
Figure 7:
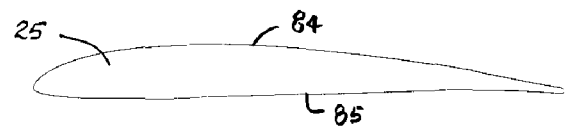
FIG. 7 is a profile of the airfoil shape of the wing of FIGS. 6A and 6B.

Details of one version of the wings are shown in FIGS. 6A and 6B, which depict a right wing 25. The left wing is a mirror image of the right wing. The wing span extends from the root 45 to the wing tip 47. The wing root includes a shoulder 74 with a socket 76 for the axle and the hole 77 that receives the actuator rod that drives the wing. The wing includes an inner panel 78 extending from the root toward the wing tip and an outer panel 80 extending from the inner panel to the wing tip. The two panels are oblique to each other and form a dihedral wing. The dihedral angle 82 matches the angle α formed by the forward and rearward segments of the wing slots. As shown in the profile of FIG. 7, upper and lower airfoil surfaces 84, 85 of the exemplary wing form a cambered wing 25 with inherent lift characteristics.

Figure 8:
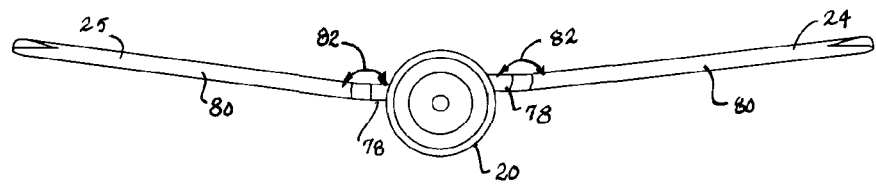
FIG. 8 is a front elevation view of the position controller of FIG. 1.

The left and right wings 24, 25 form a polyhedral wing system with dihedrals 82 between the inner panels 78 and the outer panels 80, as shown in FIG. 8 with both wings fully open. The two inner panels are parallel to each other and offset radially because of the radial offset of the rotary actuators.

Figure 9A:
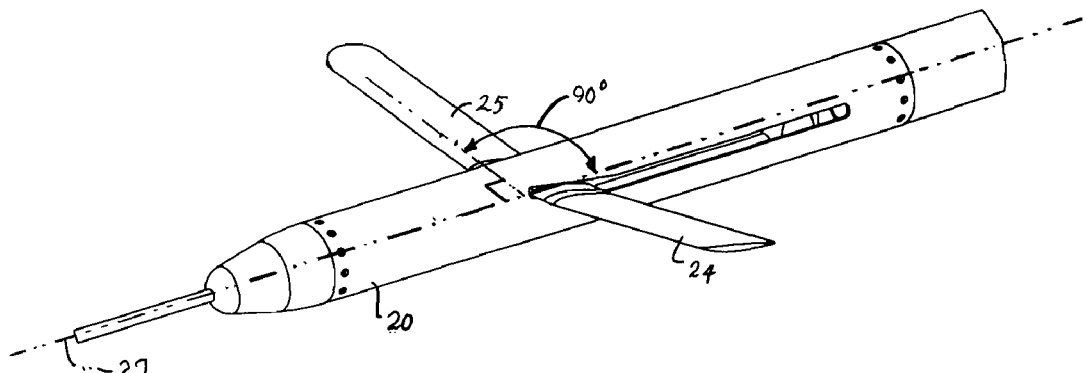
FIGS. 9A-9C are isometric views of the position controller of FIG. 1 with the wings fully deployed, partially deployed, and fully retracted.
Figure 9B:
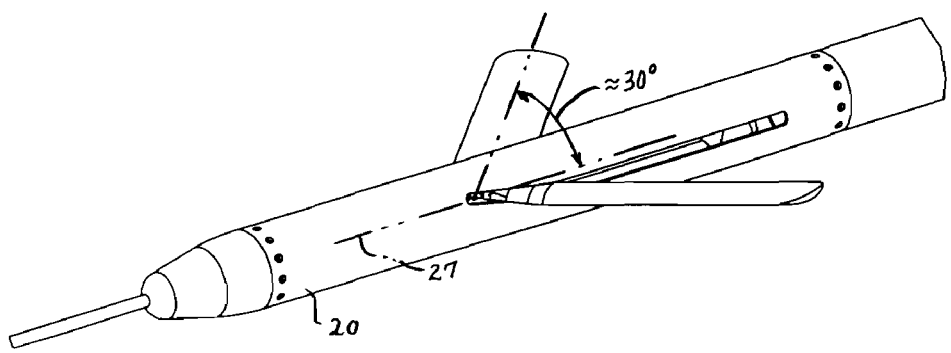
Figure 9C:
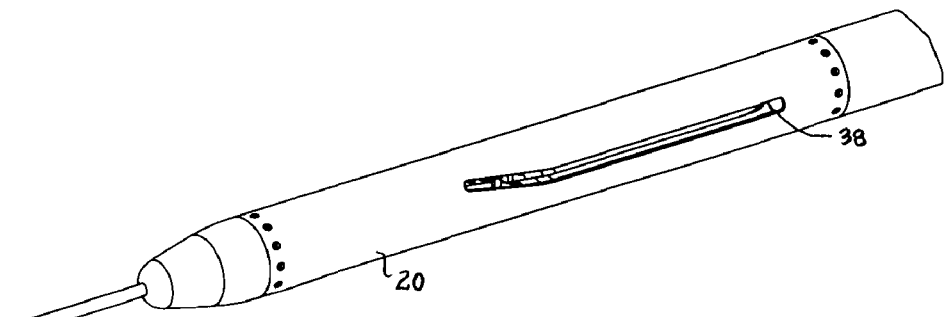

The position controller 20 is shown with the wings in three positions in FIGS. 9A-9C. In all three positions shown, the left and right wings are symmetrically disposed with reference to the longitudinal axis. In FIG. 9A, the wings 24, 25 are shown fully open, each at a sweep angle 86 of 90° measured from the longitudinal axis 27. The fully open wings produce maximum lift at a given tow speed. The wings are shown partly open in FIG. 9B at sweep angles of about 30° for less lift. The wings are shown in a fully retracted, or stowed, position at sweep angles of 0° in FIG. 9C. When stowed within the wing receptacle 38 in the fuselage, the upper airfoil surface of the left wing is adjacent to the lower airfoil surface of the right wing in a stacked configuration. Thus, the wings scissors open as required from a retracted position at a sweep angle of 0° to a fully open position at a sweep angle of 90° in this example.

Figure 10:
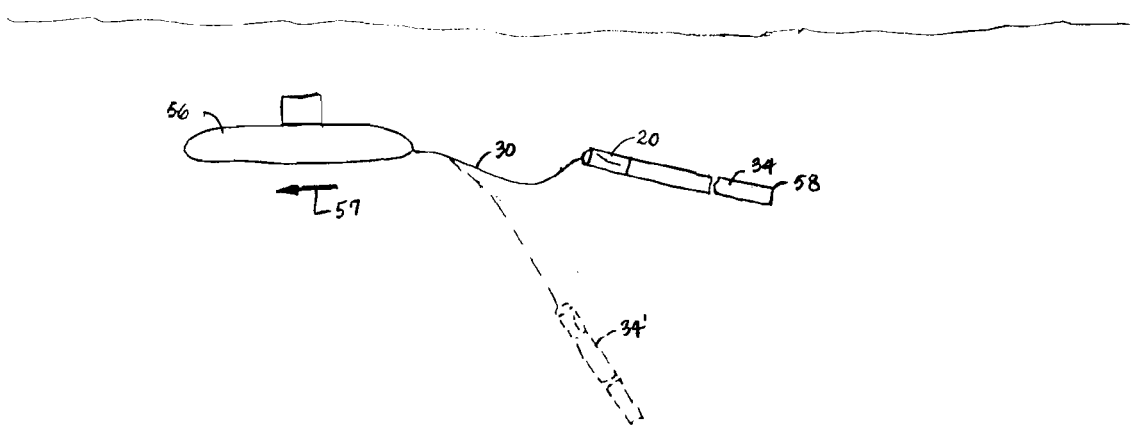
FIG. 10 is a side elevation representation of a submarine towing an array provided with a position controller as in FIG. 1.

With the wings stacked in a stowed configuration, the position controller can be deployed from or reeled into a submarine 56 along with the array and the tow cable. The array 34 is preferably deployed as in FIG. 10 with the position controller 20 between the tow cable 30 and the array. With the wings in an open position, the forward motion 57 of the submarine, even at low speeds, pulls the position controller through the water with the wings producing lift to move the array toward the sea surface until the lift and buoyancy forces equal the weight of the deployed system. Because even light-weight tow cables and ballasted arrays are not weightless, the tow cable will droop and the array will sag at its tail 58. Tail sag can be eliminated by attaching a second position controller to the tail. If the wings are stowed or if the array is deployed without a position controller at all, the array will sink at low forward speeds, as indicated by the sinking array 34'.

Figure 11A:
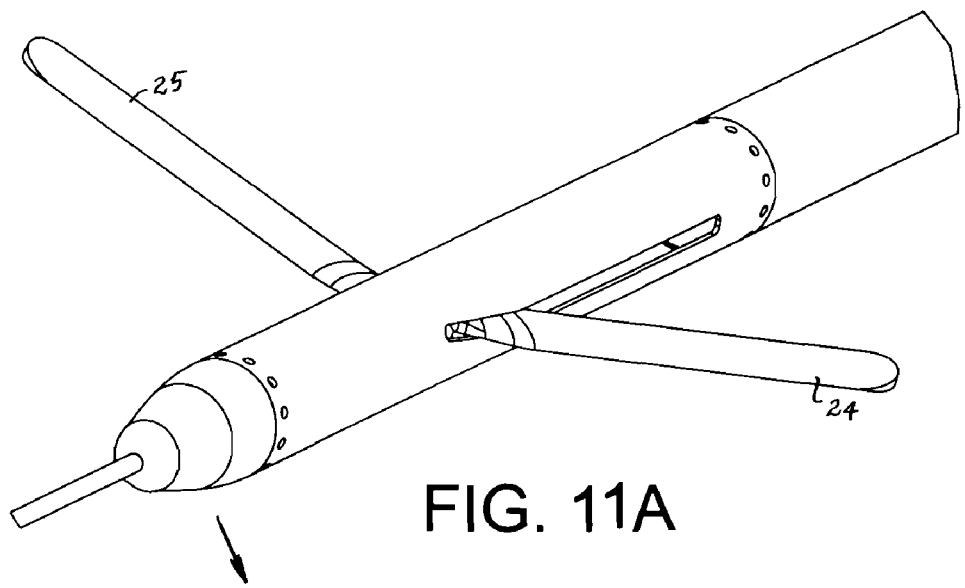
FIGS. 11A and 11B are perspective views of the position controller of FIG. 1 with the wings arranged to steer left and to steer right.
Figure 11B:
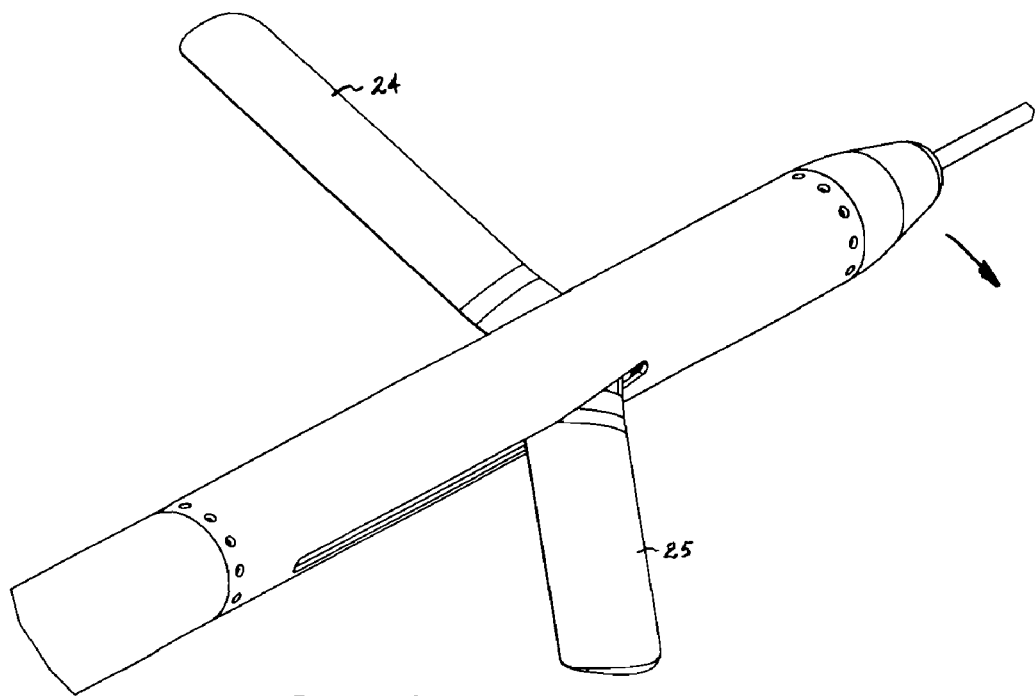

The position controller may also be used to steer the towed array laterally. The controller, when commanded, orients the wings in an asymmetrical configuration, which rolls the device. The wings will then be adjusted to maintain a banked condition. In a banked condition, the lift vector has both a vertical and a horizontal component. The horizontal component steers the array 34 laterally, while the vertical component controls the depth. Because each wing 24, 25 is controlled separately by its own actuator, the sweep angle of each wing can differ from that of the other. In FIG. 11A, the left wing 24 is retracted at a smaller sweep angle than the right wing 25 to steer the array to the left. In FIG. 11B, the right wing is retracted more to steer the array toward the right. In this way, the array can be secured from a position directly behind the submarine to be clear of the wake.

Figure 12:
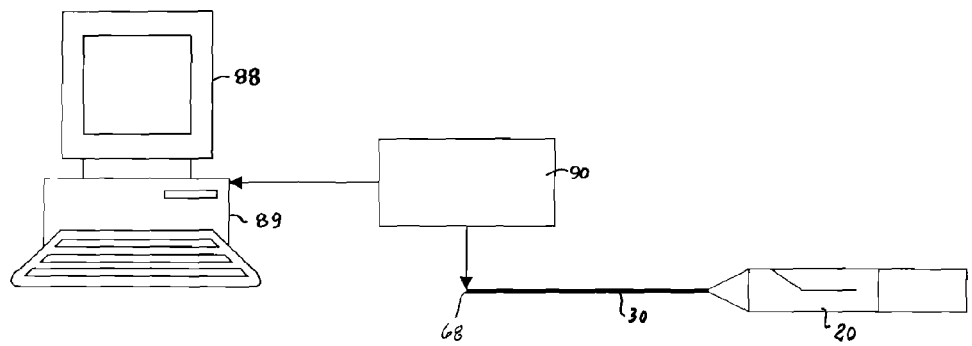
FIG. 12 is a schematic diagram of a communication and position control system usable with the position controller of FIG. 1.
Figure 13:
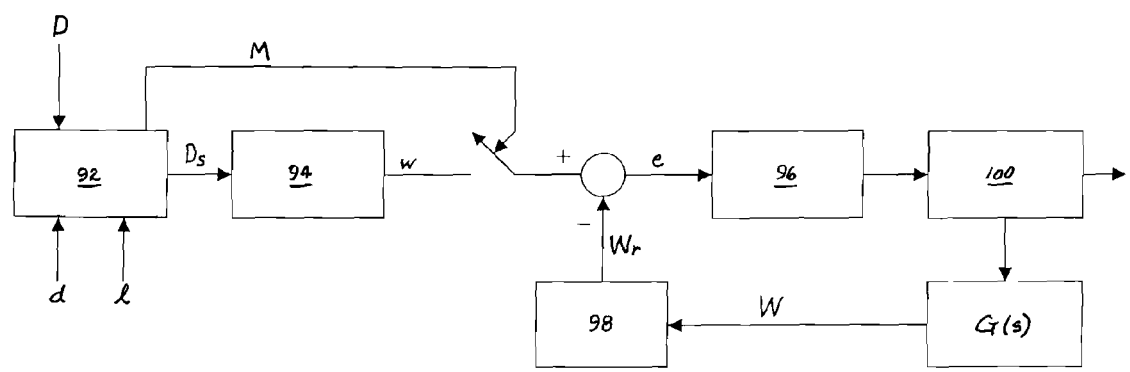
FIG. 13 is a block diagram of a position control system usable in the position controller of FIG. 1.

An array position control system usable with the position controller of FIG. 1 is shown in FIGS. 12 and 13. An operator in the submarine's sonar room, for example, monitors the position of the array and adjusts depth and lateral position from a graphical user interface (GUI) 88. Signals representing depth or wing angle settings are transmitted to the position controller 20 over the conductors 68 in the tow cable 30. A signal decoupler 90 between the GUI computer and the tow cable helps direct signals between the wet and dry ends of the array system and to multiplex its operation with an onboard combat system. Signals representing depth are transmitted in the opposite direction back to the workstation. Other signals, representing depth, roll, acoustic measurements, array status, and position controller status, for example, may also be transmitted back to a computer 89 at the GUI or to the combat system. Other control signals and command signals may be transmitted to the position controller or the array from the GUI or from the combat system.

One version of a control for use with the position controller is shown in FIG. 13. The operator aboard the submarine selects a depth d or a lateral offset l at the GUI. The selected depth and lateral offset are input to a communication interface 92, which also receives the actual depth D from a depth sensor in the array or aboard the position controller. The communication interface outputs a depth set point $D_s$ to a depth/roll control algorithm 94, which computes a wing position set point w. The position controller may also be operated in a manual wing position configuration. In the manual state, the communication interface sends a signal M commanding the position controller to set its wings at preselected angles. The wing position set point w is ignored. In the automatic depth and position state, the wing position set point w is selected for processing in a wing control algorithm 96. The actual wing position W is compensated to account for the roll of the position controller in a roll compensation algorithm 98, which produces an instantaneous roll-compensated wing position $W_r$. An error signal e equal to $w-W_r$ is input to the wing control algorithm, which produces control signals that are sent to the wing actuators through a motor interface control 100. The control system can continuously control the actuators to change the sweep angles of either or both wings to cause the position controller to seek the desired depth or lateral position or bank angle. The response of the entire towed system is determined by its transfer function G(s). The wing position sensor determines the actual wing position W, and the roll sensor determines the actual roll, from which the roll-compensated wing position $W_r$ is determined. In a preferred configuration, the depth sensor is mounted in the array, and the roll sensor and the wing position sensor are mounted in the position controller. But the depth sensor could alternatively be housed in the position controller's fuselage.

Figure 14:
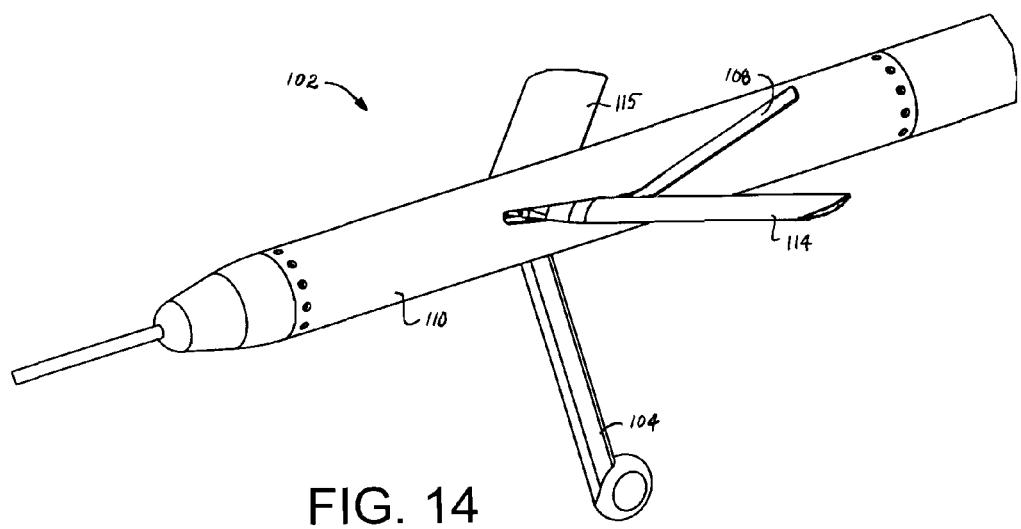
FIG. 14 is an isometric view of another version of a position controller embodying features of the invention, including a retractable stabilizing weight.
Figure 15:
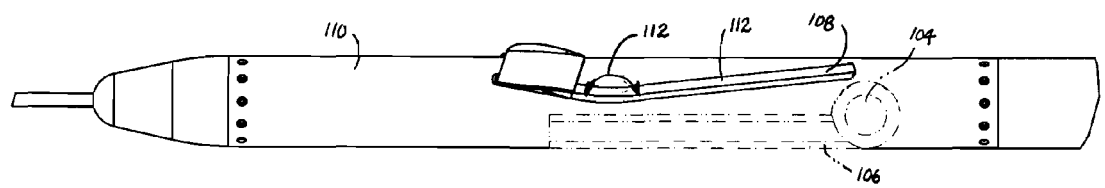
FIG. 15 is a side elevation view of the position controller of FIG. 16 with the stabilizing weight fully retracted.

Another version of a position controller is shown in FIGS. 14 and 15. The position controller 102 differs from the device in FIG. 1 most conspicuously in that it further includes a retractable stabilizing weight 104, shown in a fully extended position in FIG. 14. The stabilizing weight, which is at the end of an arm, is pivoted into and out of a recess 106 between stowed and deployed states by a motorized actuator (not shown for drawing clarity). When deployed, the weight produces a righting moment, which reduces the load on the control system by providing passive stability. A wing receptacle 108 is formed in the fuselage 110 with a rearward segment 112 tilted off the longitudinal axis to accommodate the stabilizing weight's recess. Thus, the dihedral 112 of the wings 114, 115 is greater than for the wings of FIG. 1. Like the dihedral wings, the stabilizing weight helps stabilize the position controller in roll.

Figure 16:
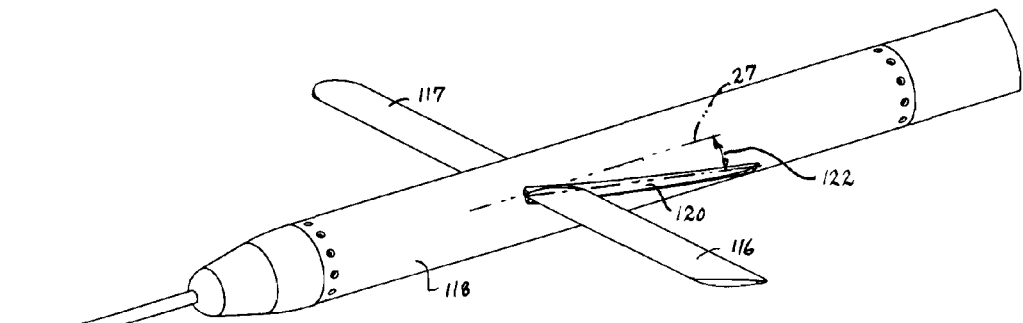
FIG. 16 is a perspective view of yet another version of depth controller embodying features of the invention, including planar wings.

Another version of a position control device, shown in FIG. 16, has planar wings 116, 117, without camber or dihedral, extending from a fuselage 118. Openings 120 in the outer surface of the fuselage are linear, rather than segmented, and are disposed, for example, forming an angle 122 of about 7° with the longitudinal axis 27 of the position controller.

Although the invention has been disclosed with reference to a few preferred versions, other versions are possible. For example, the retractable stabilizing weight may be used in any of the versions shown as long as provisions are made to stow the stabilizing weight and wings simultaneously. As another example, the wing actuators may be realized in a variety of ways other than the linear lead screw mechanisms shown. As just one example, a servo- or stepper-motor-driven pinion driving a star gear radially attached to the wing root can serve as the rotary actuator for each wing. A single wing receptacle opening onto the outer surface at two diametrically opposite positions is shown in the drawings, but two receptacles, one for each wing opening on opposite, not necessarily diametrically opposite, sides of the fuselage and not extending all the way through could alternatively be used to stow the wings. So, as these few examples suggest, the scope of the claims is not meant to be limited to the details of the exemplary versions described in the specification.

What is claimed is:

1. Apparatus for positioning a towed underwater cable, the apparatus comprising:
   an elongated body having an outer surface disposed about a longitudinal axis, the elongated body suitable for being connected axially in line with a towed underwater cable;
   a first wing swingable outward from the elongated body through a first opening formed in the outer surface;

a second wing swingable outward from the elongated body through a second opening formed in the outer surface opposite the first opening;

each of the first and second wings extending from a root to a wing tip;

a first wing actuator disposed within the body and coupled to the root of the first wing to rotate the first wing on a first axis of rotation between a stowed position within the elongated body to operational positions wherein the wing tip is outside the elongated body and the span of the first wing defines a first sweep angle with the longitudinal axis of the elongated body;

a second wing actuator disposed within the body and coupled to the root of the second wing to rotate the second wing on a second axis of rotation between a stowed position within the elongated body to operational positions wherein the wing tip is outside the elongated body and the span of the second wing defines a second sweep angle with the longitudinal axis of the elongated body;

wherein the first and second sweep angles are independently adjustable by the first and second actuators.

2. Apparatus as in claim 1 wherein the first and second wings form a polyhedral wing system.

3. Apparatus as in claim 1 wherein the first and second wings each include first and second panels obliquely connected to form dihedral first and second wings.

4. Apparatus as in claim 1 wherein the first and second wings define a non-zero angle of attack with the longitudinal axis of the elongated body.

5. Apparatus as in claim 1 wherein the first and second axes of rotation coincide.

6. Apparatus as in claim 1 wherein the first and second wings are cambered.

7. Apparatus as in claim 1 wherein the first and second openings communicate with each other within the elongated body.

8. Apparatus as in claim 1 wherein the first and second openings include first and second segments oblique to each other.

9. Apparatus as in claim 1 wherein the first and second wings are in stacked relation within the elongated body when both are in the stowed position.

10. Apparatus as in claim 1 further comprising a retractable stabilizing weight extendable outward of the elongated body.

11. Apparatus as in claim 1 further comprising a roll sensor within the elongated body for sensing the roll of the elongated body about the longitudinal axis.

12. A position controller for a towed underwater cable, the position controller comprising:

a body having an outer surface and suitable for being connected in line with a towed underwater cable;

a first dihedral wing having first and second obliquely connected wing panels and a wing tip swingable outward from the body through a first slot formed in the outer surface;

a second dihedral wing having first and second obliquely connected wing panels and a wing tip swingable outward from the body through a second slot formed in the outer surface.

13. A position controller as in claim 12 wherein the first and second wings define a non-zero angle of attack.

14. A position controller as in claim 12 wherein the first and second wings are cambered.

15. A position controller as in claim 12 wherein the first and second wings are independently swingable through respective first and second sweep angles measured from a stowed position in which the first and second wings are parallel and completely within the body.

16. A position controller as in claim 15 wherein the first and second swing angles range from the stowed position at 0° to a fully open position at 90°.

17. A position controller as in claim 12 further comprising a first actuator swinging the first wing and a second actuator swinging the second wing.

18. A position controller for a towed underwater cable, the position controller comprising:

an elongated body suitable for being connected axially in line with a towed underwater cable and having an outer surface disposed about a longitudinal axis with first and second slots through the outer surface;

wherein the first and second slots each include a forward segment oblique to the longitudinal axis and a rearward segment oblique to the forward segment;

a first wing having a wing tip swingable outward from the elongated body through the first slot;

a second wing having a wing tip swingable outward from the elongated body through the second slot.

19. A position controller as in claim 18 wherein the first and second wings each include first and second panels obliquely connected to form dihedral first and second wings.

20. A position controller as in claim 18 wherein the first and second slots form a continuous passage through the elongated body.

21. Apparatus for positioning a towed underwater cable, the apparatus comprising:

an elongated body having an outer surface disposed about a longitudinal axis, the elongated body suitable for being connected axially in line with a towed underwater cable;

the outer surface being divided into a first half and a second half by a plane containing the longitudinal axis;

the elongated body forming a first opening in the first half of the outer surface and a second opening in the second half of the outer surface;

a first wing swingable outward from the elongated body through the first opening, the first wing extending from a wing root along an inner wing panel to an outer wing panel terminated in a distal wing tip;

a second wing swingable outward from the elongated body through the second opening, the second wing extending from a wing root along an inner wing panel to an outer wing panel terminated in a distal wing tip;

wherein the inner wing panels of the first and second wings have chords defining a non-zero angle of attack with the longitudinal axis of the elongated body; and wherein the first and second openings each include a forward segment oblique to the longitudinal axis and a rearward segment oblique to the forward segment.

22. Apparatus as in claim 21 wherein the inner panel of the first wing is in a non-coplanar relationship with the inner panel of the second wing.

23. Apparatus as in claim 21 further comprising a first actuator swinging the first wing and a second actuator independently swinging the second wing.

24. Apparatus as in claim 21 wherein the first wing is retractable through the first opening with the forward segment receiving the inner panel and the rearward segment receiving the outer panel and wherein the second wing is retractable through the second opening with the forward segment receiving the inner panel and the rearward segment receiving the outer panel.

25. Apparatus for positioning a towed underwater cable, the apparatus comprising:

a body having an outer surface disposed about a longitudinal axis, the body suitable for being connected axially in line with a towed underwater cable;

the outer surface being divided into a first half and a second half by a plane containing the longitudinal axis;

the body forming a cavity in the interior of the body extending to a first opening in the first half of the outer surface a second opening in the second half of the outer surface;

a first wing swingable outward from the cavity through the first opening, the first wing having upper and lower airfoil surfaces;

a second wing swingable outward from the cavity through the second opening, the second wing having upper and lower airfoil surfaces;

wherein, in a stowed position, the first and second wings are stacked in the cavity with the upper airfoil surface of the second wing adjacent the lower airfoil surface of the first wing.

26. Apparatus as in claim 25 wherein the first and second wings are swingable outward of the body over sweep angles ranging from 0° in the stowed position to 90° in a fully extended position of the wings.

27. Apparatus as in claim 25 wherein the cavity has a forward segment oblique to the longitudinal axis and a rearward segment oblique to the forward segment.

\* \* \* \* \*